US012685420B2

(12) United States Patent
Niu et al.

(10) Patent No.: US 12,685,420 B2
(45) Date of Patent: Jul. 21, 2026

(54) OBSTACLE AVOIDANCE METHOD FOR ROBOT, OBSTACLE AVOIDANCE DEVICE FOR ROBOT, AND NON-TRANSITORY COMPUTER READABLE STORAGE MEDIUM

(71) Applicant: Beijing Roborock Innovation Technology Co., Ltd., Beijing (CN)

(72) Inventors: Yansheng Niu, Beijing (CN); Lei Zhang, Beijing (CN); Haojian Xie, Beijing (CN)

(73) Assignee: Beijing Roborock Innovation Technology Co., Ltd., Beijing (CN)

( * ) Notice: Subject to any disclaimer, the term of this patent is extended or adjusted under 35 U.S.C. 154(b) by 578 days.

(21) Appl. No.: 17/906,711

(22) PCT Filed: Jan. 5, 2021

(86) PCT No.: PCT/CN2021/070297
§ 371 (c)(1),
(2) Date: Sep. 19, 2022

(87) PCT Pub. No.: WO2021/208530
PCT Pub. Date: Oct. 21, 2021

(65) Prior Publication Data
US 2023/0200613 A1 Jun. 29, 2023

(30) Foreign Application Priority Data
Apr. 14, 2020 (CN) .......................... 202010292306.4

(51) Int. Cl.
*A47L 11/40* (2006.01)
*G05D 1/00* (2024.01)

(52) U.S. Cl.
CPC ........ *A47L 11/4011* (2013.01); *G05D 1/0214* (2013.01); *G05D 1/0238* (2013.01); *G05D 1/0272* (2013.01); *A47L 2201/04* (2013.01)

(58) Field of Classification Search
CPC ............. A47L 11/4011; A47L 2201/04; G05D 1/0214; G05D 1/0238; G05D 1/0272;
(Continued)

(56) References Cited

U.S. PATENT DOCUMENTS

| | | | |
|---|---|---|---|
| 2017/0080570 A1 | 3/2017 | Schnittman et al. | |
| 2019/0370691 A1 | 12/2019 | Chae | |
(Continued)

FOREIGN PATENT DOCUMENTS

| | | |
|---|---|---|
| CN | 106205223 A | 12/2016 |
| CN | 106774312 A | 5/2017 |
(Continued)

OTHER PUBLICATIONS

International Search Report for PCT Patent Application No. PCT/CN2021/070297 mailed Mar. 22, 2021.
(Continued)

*Primary Examiner* — Hitesh Patel
*Assistant Examiner* — John D Holman
(74) *Attorney, Agent, or Firm* — Thomas Horstemeyer, LLP

(57) ABSTRACT

An obstacle avoidance method for a robot, applied to a robot side, comprises: obtaining trap feature information in real time during travel of the robot, wherein the trap feature information comprises a sensor parameter and/or image information; determining whether a current location is located in a trap region when determining that the trap feature information meets a trap condition, wherein the trap region indicates a region in which the robot was trapped or is prone to be trapped; and giving up a current traveling
(Continued)

route and traveling out of the trap region when determining that the current location is located in the trap region.

15 Claims, 7 Drawing Sheets

(58) Field of Classification Search
CPC .... G05D 1/0246; G05D 1/027; G05D 1/0236; G05D 1/024; G05D 1/0242; G05D 1/0251; G05D 1/0255
USPC ......................................................... 701/301
See application file for complete search history.

(56) References Cited

U.S. PATENT DOCUMENTS

| | | | | | |
|---|---|---|---|---|---|
| 2020/0174489 | A1* | 6/2020 | Jung | ...................... | G06N 20/00 |
| 2022/0118613 | A1* | 4/2022 | Shin | ......................... | B25J 9/161 |
| 2022/0137631 | A1* | 5/2022 | Udagawa | ............... | G05D 1/247 |
| | | | | | 701/28 |

FOREIGN PATENT DOCUMENTS

| | | | |
|---|---|---|---|
| CN | 107049155 | A | 8/2017 |
| CN | 107092260 | A | 8/2017 |
| CN | 107443430 | A | 12/2017 |
| CN | 107943025 | A | 4/2018 |
| CN | 108873880 | A | 11/2018 |
| CN | 108958263 | A | 12/2018 |
| CN | 109375618 | A | 2/2019 |
| CN | 109394086 | A | 3/2019 |
| CN | 109528089 | A | 3/2019 |
| CN | 109645892 | A | 4/2019 |
| CN | 109947109 | A | 6/2019 |
| CN | 110051292 | A | 7/2019 |
| CN | 110244743 | A | 9/2019 |
| CN | 110338708 | A | 10/2019 |
| CN | 110340882 | A | 10/2019 |
| CN | 110448241 | A | 11/2019 |
| CN | 110554696 | A | 12/2019 |
| CN | 110974088 | A | 4/2020 |
| CN | 111427357 | A | 7/2020 |
| EP | 4137905 | A1 | 2/2023 |
| JP | 2006262009 | A | 9/2006 |
| JP | 2010061293 | A | 3/2010 |

OTHER PUBLICATIONS

First Office Action for CN Patent Application No. CN202010292306.4 mailed Mar. 18, 2021.
Second Office Action for CN Patent Application No. CN202010292306.4 mailed Nov. 19, 2021.
Extended European Search Report in App. No. 21788887.4 dated Mar. 15, 2024.
EP21788887.4-1st Office Action mailed Apr. 11, 2025.

* cited by examiner

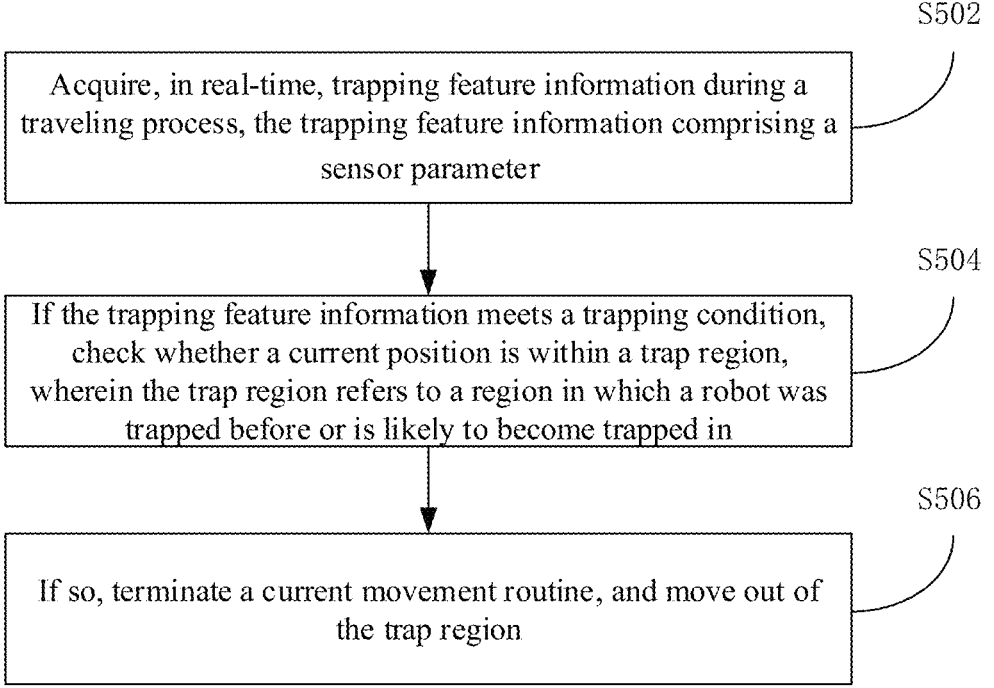

S502

Acquire, in real-time, trapping feature information during a traveling process, the trapping feature information comprising a sensor parameter

S504

If the trapping feature information meets a trapping condition, check whether a current position is within a trap region, wherein the trap region refers to a region in which a robot was trapped before or is likely to become trapped in

S506

If so, terminate a current movement routine, and move out of the trap region

FIG. 5

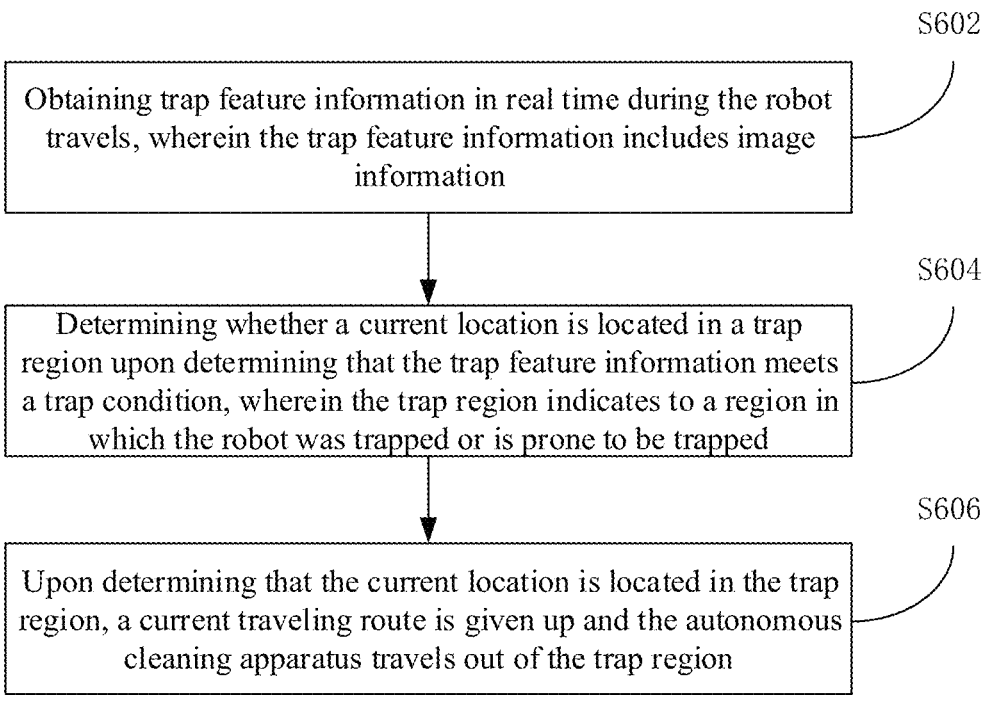

Obtaining trap feature information in real time during the robot travels, wherein the trap feature information includes image information — S602

Determining whether a current location is located in a trap region upon determining that the trap feature information meets a trap condition, wherein the trap region indicates to a region in which the robot was trapped or is prone to be trapped — S604

Upon determining that the current location is located in the trap region, a current traveling route is given up and the autonomous cleaning apparatus travels out of the trap region — S606

FIG. 6

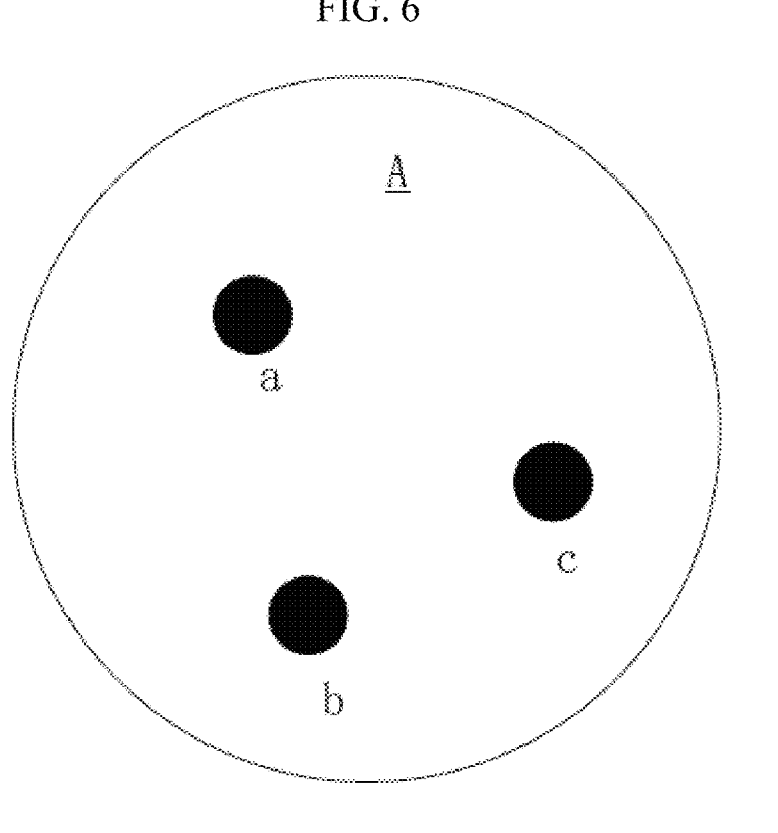

FIG. 7

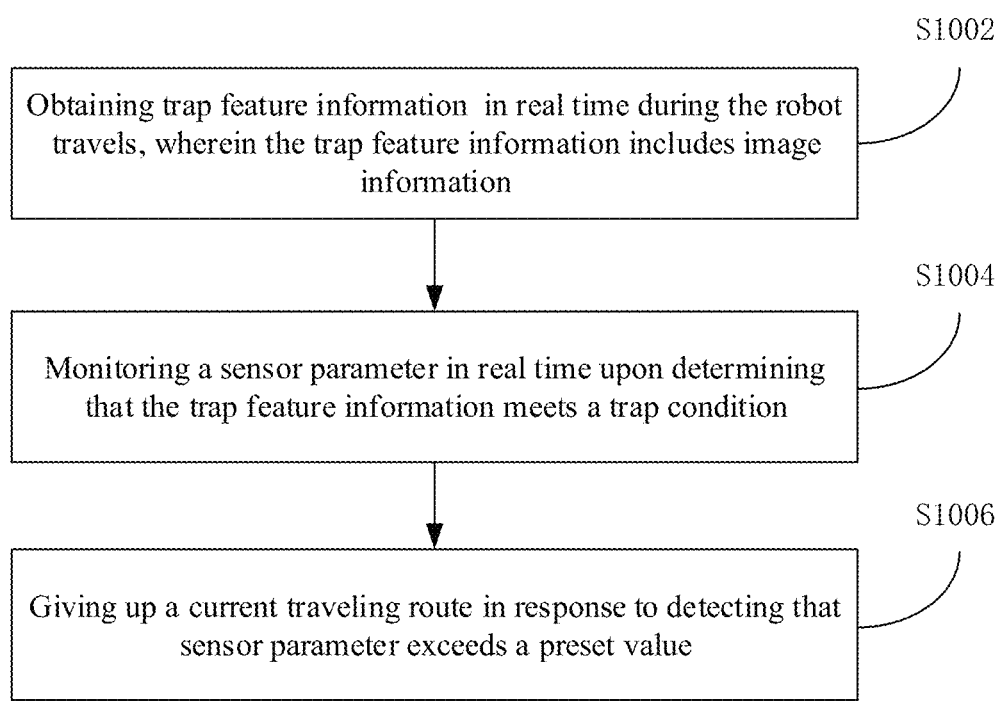

S1002

Obtaining trap feature information in real time during the robot travels, wherein the trap feature information includes image information

S1004

Monitoring a sensor parameter in real time upon determining that the trap feature information meets a trap condition

S1006

Giving up a current traveling route in response to detecting that sensor parameter exceeds a preset value

FIG. 10

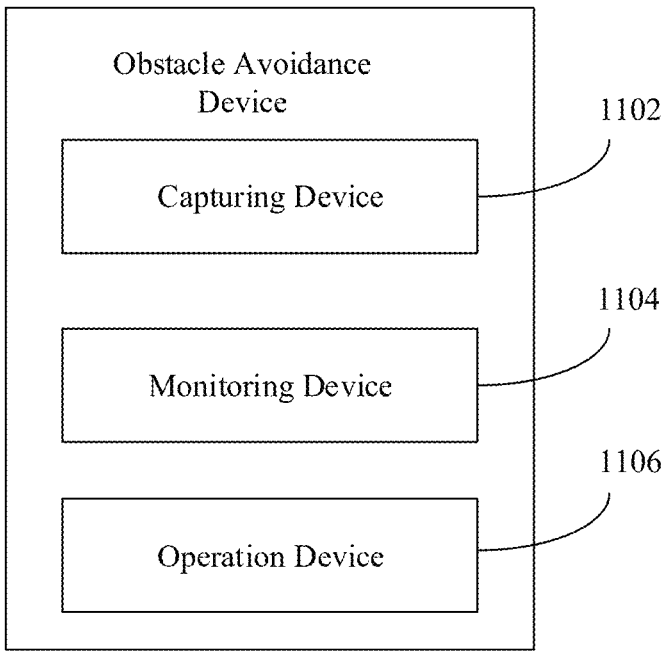

Obstacle Avoidance Device

Capturing Device — 1102

Monitoring Device — 1104

Operation Device — 1106

FIG. 11

OBSTACLE AVOIDANCE METHOD FOR ROBOT, OBSTACLE AVOIDANCE DEVICE FOR ROBOT, AND NON-TRANSITORY COMPUTER READABLE STORAGE MEDIUM

CROSS-REFERENCE TO RELATED APPLICATIONS

This application is a US national phase application under 35 U.S.C. § 371 of PCT application number PCT/CN2021/070297, which claims priority to Chinese Patent Application No. 202010292306.4, filed on Apr. 14, 2020, both of which are incorporated herein by reference in their entireties.

TECHNICAL FIELD

The present disclosure relates to the field of robot control technologies, and in particular, to an obstacle avoidance method for a robot, an obstacle avoidance device for a robot and a non-transitory computer readable storage medium.

BACKGROUND

With the development of technologies, various intelligent robots such as sweeping robots, mopping robots, vacuum cleaners, and weeders appear. These robots can automatically identify a sweeping route and select a sweeping mode according to the sweeping route, which not only saves labor force but also reduces labor costs.

In a cleaning process, a sweeping robot often encounters a trap condition. For example, the sweeping robot is prone to be trapped under a furniture, at a corner of a wall, or at a step and cannot continue to travel. For another example, when the sweeping robot travels to a relatively short object, the sweeping robot may be stuck on the object (such as a dustpan) and cannot continue to work until a user moves the sweeping robot away from the trap location. However, in a subsequent cleaning process, when traveling to the trap location, the sweeping robot may be still stuck for the same reason. Because the sweeping robot cannot automatically avoid a related obstacle, the user is required to intervene each time so that the sweeping robot can continue to work, causing poor user experience.

SUMMARY

In view of this, embodiments of the present disclosure provide a method and an apparatus of obstacle avoidance for a robot, and a storage medium, so that the robot can avoid an obstacle automatically.

An embodiment of the present disclosure provides an obstacle avoidance method for a robot, applied to a robot side and including:

obtaining trap feature information in real time during the travel of the robot, wherein the trap feature information includes at least one of a sensor parameter and image information;

in response to determining that the trap feature information meets a trap condition, determining whether a current location is located in a trap region, wherein the trap region indicates a region in which the robot was trapped or is prone to be trapped; and in response to determining that the current location is located in the trap region, giving up travelling a current traveling route, and traveling out of the trap region An embodiment of the present disclosure provides an obstacle avoidance device for a robot, applied to a robot side and including:

an obtaining unit, configured to obtain trap feature information in real time during the travel of the robot, wherein the trap feature information includes at least one of a sensor parameter and image information;

a determining unit, configured to: determine whether a current location is located in a trap region in response to determining that the trap feature information meets a trap condition, wherein the trap region indicates a region in which the robot was trapped or is prone to be trapped; and a control unit, configured to: give up travelling a current traveling route and travelling out of the trap region in response to determining that the current location is located in the trap region.

An embodiment of the present disclosure provides an obstacle avoidance method for a robot, applied to a robot side and including:

obtaining trap feature information in real time during travel of the robot, wherein the trap feature information includes image information;

monitoring a sensor parameter in real time upon determining that the trap feature information meets a trap condition; and changing a current traveling route upon detecting that the sensor parameter exceeds a preset value.

An embodiment of the present disclosure provides an obstacle avoidance device for a robot, applied to a robot side and including:

a capturing unit, configured to obtain trap feature information in real time during travel of the robot, wherein the trap feature information includes image information;

a monitoring unit, configured to monitor a sensor parameter in real time upon determining that the trap feature information meets a trap condition; and an operation unit, configured to change a current traveling route upon detecting that the sensor parameter exceeds a preset value.

Optionally, determining that the trap feature information meets the trap condition includes: the image information includes a preset obstacle or scenario that is prone to cause a trap.

An embodiment of the present disclosure provides a non-transitory computer readable storage medium, in which a computer program instruction is stored, and the computer program instruction implements operations of any one of the foregoing methods when being invoked and executed by a processor.

An embodiment of the present disclosure provides an obstacle avoidance device for a robot, applied to a robot side including:

a processor; and a memory configured to store instructions executable by the processor;

wherein the processor is configured to execute the instructions to implement the following operations:

obtaining trap feature information in real time during travel of the robot, wherein the trap feature information includes at least one of a sensor parameter and image information;

in response to determining that the trap feature information meets a trap condition, determining whether a current location is located in a trap region, wherein the trap region indicates a region in which the robot was trapped or is prone to be trapped; and in response to determining that the current location is located in the trap region, giving up travelling a current traveling route, and traveling out of the trap region.

BRIEF DESCRIPTION OF DRAWINGS

To describe the technical solutions in the embodiments of the present disclosure or in the prior art more clearly, the following briefly describes the accompanying drawings needed for describing the embodiments or the prior art. Clearly, the accompanying drawings in the following description show some embodiments of the present disclosure, and one of ordinary skill in the art can still derive other drawings from these accompanying drawings without creative efforts.

FIG. 5 illustrates a schematic flowchart of an obstacle avoidance method for an automatic cleaning apparatus according to an embodiment of the present disclosure;

FIG. 6 illustrates a schematic flowchart of an obstacle avoidance method for an automatic cleaning apparatus according to another embodiment of the present disclosure;

FIG. 7 illustrates a schematic diagram of a mapping relationship of an obstacle avoidance region according to an embodiment of the present disclosure;

FIG. 10 illustrates a schematic flowchart of an obstacle avoidance method for an automatic cleaning apparatus according to another embodiment of the present disclosure;

FIG. 11 illustrates a schematic structural diagram of an obstacle avoidance device for an automatic cleaning apparatus according to another embodiment of the present disclosure.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Clearly, the described embodiments are merely some rather than all of the embodiments of the present disclosure. Based on the embodiments of the present disclosure, a person skilled in the art can obtain other embodiments without creative efforts, which all fall within the scope of the present disclosure.

It should be understood that although terms "first", "second", "third", and the like may be used in the embodiments of the present disclosure to describe an element, the element should not be limited to the terms. These terms are merely intended to distinguish between the elements For example, without departing from the scope of the embodiments of the present disclosure, first element may also be referred to as second element, and similarly, second element may also be referred to as first element.

Figure 1:
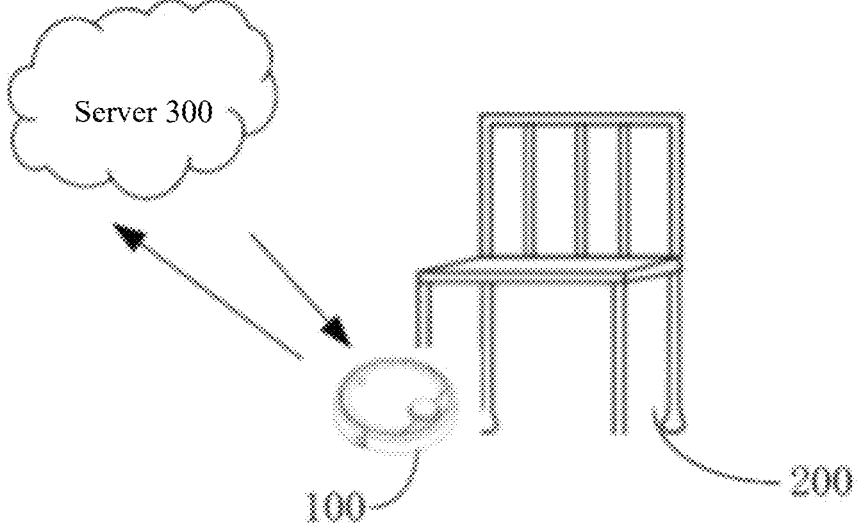
FIG. 1 illustrates a schematic diagram of an application scenario according to an embodiment of the present disclosure.

An embodiment of the present disclosure provides a possible application scenario, and the application scenario includes an automatic cleaning apparatus 100, such as a sweeping robot, a mopping robot, a vacuum cleaner, and a weeder. In this embodiment, as illustrated in FIG. 1, a household sweeping robot is taken as an example for description. In a working process of the household sweeping robot, sweeping may be performed according to a preset route or an automatically planned route, but inevitably, the household sweeping robot cannot move when being stuck at a location, for example by a chair 200 or a table. In this case, the sweeping robot may automatically identify an obstacle through a cloud server 300, a local server, or its own storage system, and label the location as an obstacle location, and automatic obstacle avoidance may be performed next time when the sweeping robot travels to the location. In this embodiment, the robot may be provided with a touch-sensitive display so as to receive an operation instruction entered by a user or controlled by a mobile terminal to receive an operation instruction entered by a user. An automatic cleaning apparatus may be provided with various sensors, such as a buffer, a cliff sensor, an ultrasonic sensor, an infrared sensor, a magnetometer, an accelerometer, a gyroscope, and an odograph (a structure of each sensor is not described in detail, and any one of the sensors may be applied to the automatic cleaning apparatus), and may further be provided with a wireless communications module such as a Wi-Fi module and a Bluetooth module to be connected to an intelligent terminal or a server, and receive, through the wireless communications module, operation instruction transmitted by the intelligent terminal or the server.

Figure 2:
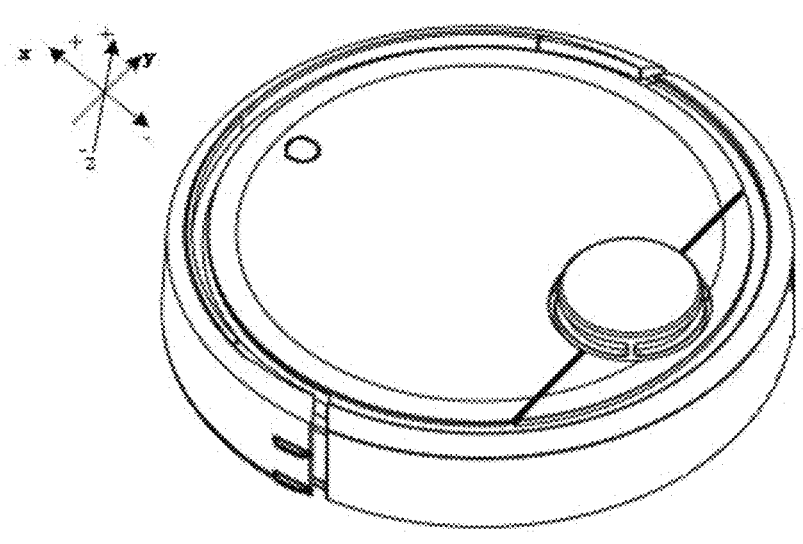
FIG. 2 illustrates a three-dimensional structural view of an automatic cleaning apparatus according to an embodiment of the present disclosure.

As illustrated in FIG. 2, the automatic cleaning apparatus 100 may travel on the ground according to various combinations of the movement with respect to the following three mutually perpendicular axes defined by a machine body 110: a front and rear axis X, a lateral axis Y, and a central vertical axis Z. A forward drive direction along the front and rear axis X is defined as "forward", and a backward drive direction along the front and rear axis X is defined as "backward". The direction of the lateral axis Y is substantially a direction that extends between the right wheel and the left wheel of the robot passing through an axis center defined by the center point of a drive wheel module 141.

The automatic cleaning apparatus 100 can rotate around the Y-axis. When the front part of the automatic cleaning apparatus 100 is tilted upward, and the rear part is tilted downward, this case is referred to as "pitch up"; and when the front part of the automatic cleaning apparatus 100 is tilted downward, and the rear part is tilted upward, this case is referred to as "pitch down". In addition, the robot 100 may rotate around the Z-axis. In the forward direction of the automatic cleaning apparatus 100, when the automatic cleaning apparatus 100 is tilted to the right side of the X-axis, it rotates rightward, and when the automatic cleaning apparatus 100 is tilted to the left side of the X-axis, it rotates leftward.

Figure 3:
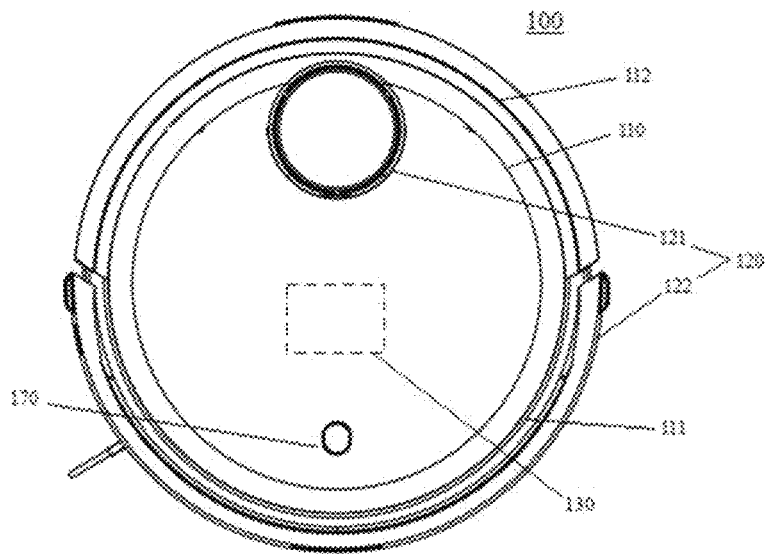
FIG. 3 illustrates a top view of a structure of an automatic cleaning apparatus according to an embodiment of the present disclosure.

As illustrated in FIG. 3, the automatic cleaning apparatus 100 includes a machine body 110, a sensing system 120, a control system 130, a drive system 140, a cleaning system, an energy system, and a human-machine interaction system 180.

The machine body 110 includes a front part 111 and a rear part 112, and has a substantively circular shape (circular shape in both the front and rear parts), or may have other shapes, including but not limited to an approximately D shape of a rectangular front part and a circular rear part, a rectangle of a rectangular front part and a rectangular rear part, or a square shape.

As illustrated in FIG. 3, the sensing system 120 includes a location determining device 121 disposed on the machine body 110, a collision sensor and a proximity sensor that are disposed on a buffer 122 which is on the front part 111 of the machine body 110, a cliff sensor disposed on a lower part of the machine body, and sensing devices such as a magnetometer, an accelerometer, a gyro (Gyro), an odograph (ODO) that are disposed inside the machine body, and are configured to provide various pieces of location information and motion state information of the automatic cleaning apparatus to the control system 130. The location determining device 121 includes but is not limited to a camera and a laser direct structuring (LDS) device.

As illustrated in FIG. 3, the front part 111 of the machine body 110 may carry the buffer 122. In a cleaning process, when the drive wheel module 141 drives the automatic cleaning apparatus to move on the ground, the buffer 122 detects one or more events in a driving path of the automatic cleaning apparatus 100 through a sensor such as an infrared sensor disposed thereon, and the automatic cleaning apparatus 100 may control, based on the events detected by the buffer 122 such as an obstacle or a wall, the drive wheel module 141 to cause the automatic cleaning apparatus 100 to respond to the events, such as keeping away from the obstacle.

The control system 130 is disposed on a circuit board in the machine body 110, and includes a computing processor, such as a central processing unit and an application processor, in communication with a NAND temporary memory, such as a hard disk, a flash memory, and a random access memory. According to obstacle information fed back by the laser direct structuring device, the computing processor, through a locating algorithm such as simultaneous localization and mapping (SLAM), draws an instant map of an environment in which the robot is located. In addition, with reference to distance information and speed information that are fed back by the sensor devices such as the sensor disposed on the buffer 122, the cliff sensor, the magnetometer, the accelerometer, the gyroscope, and the odograph, the control system determines a current working state, a location, and a current posture of the automatic cleaning apparatus, such as crossing a doorsill, moving on a carpet, locating at a cliff, being stuck at the top or bottom, a dust box being full, and being picked up, comprehensively. In addition, the control system provides a specific next action policy for different cases, so that operation of the robot better meets a requirement of its owner, such that the user has a good experience.

Figure 4:
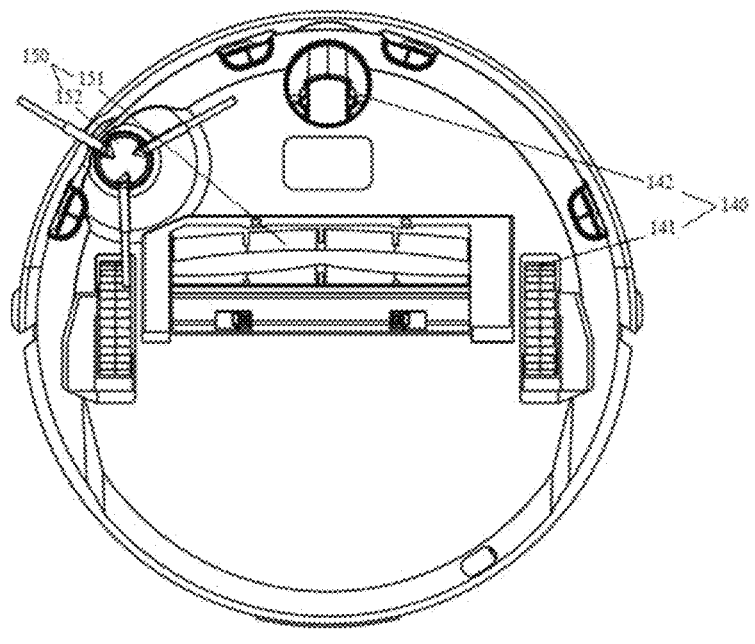
FIG. 4 illustrates a bottom view of a structure of an automatic cleaning apparatus according to an embodiment of the present disclosure.

As illustrated in FIG. 4, the drive system 140 may operate the automatic cleaning apparatus 100 to travel on the ground based on a drive command with distance information and angle information (for example, x, y, and θ components).

The drive system 140 includes a drive wheel module 141. The drive wheel module 141 may control both the left wheel and the right wheel. To more accurately control movement of the automatic cleaning apparatus, the drive wheel module 141 preferably includes a left drive wheel module and a right drive wheel module. The left and right drive wheel modules are opposed along a lateral axis defined by the machine body 110. To enable the automatic cleaning apparatus to move more stably or to have a strong capacity of moving on the ground, the automatic cleaning apparatus may include one or more driven wheels 142, and the one or more driven wheels include but are not limited to universal wheels. The drive wheel module includes a traveling wheel, a drive motor, and a control circuit configured to control the drive motor. The drive wheel module may further be connected to a circuit configured to measure a drive current and an odograph. The drive wheel module 141 may be detachably connected to the machine body 110, so as to facilitate disassembly and maintain. The drive wheel may have an offset drop suspension system, which is secured to the machine body 110 in a moveable manner, for example, in a rotatable manner, and receives a spring offset that is offset downward and away from the machine body 110. The spring offset allows the drive wheel to keep contact and traction with the ground with a force, and a cleaning system of the automatic cleaning apparatus 100 also contacts the ground 10 with a pressure.

The cleaning system may be a dry cleaning system and/or a wet cleaning system. As a dry cleaning system, a main cleaning function is derived from a sweeping system 151 formed by a brushroll, a dust box, a fan, an air outlet, and connection parts between the four. The brushroll that interferes with the ground sweeps a rubbish on the ground and rolls it to the front of a suction inlet between the brushroll and the dust box. Then, the rubbish is suctioned into the dust box by suction gas which is generated by the fan and passes through the dust box. The dry cleaning system may further include a side brush 152 having a rotation shaft that is angled relative to the ground to move debris into a brushroll region of the cleaning system.

The energy system includes a rechargeable battery, such as a Ni-MH battery and a lithium battery. The rechargeable battery may be connected to a charging control circuit, a charging temperature detection circuit of a battery pack, and a battery under-voltage monitoring circuit. The charging control circuit, the charging temperature detection circuit of the battery pack, and the battery under-voltage monitoring circuit are connected to a single-chip microcomputer control circuit. The machine body is connected to a charging dock through a charging electrode disposed on a side or below the machine body to recharge the rechargeable battery. If dust is attached to a charging electrode which is exposed, a plastic body around the electrode may be melted and deformed due to a charge accumulation effect during charging; and even the electrode itself is deformed, and the charging cannot continue normally.

The human-machine interaction system 180 includes a button provided on a panel on the machine body, and the buttons are configured for the user to select a function. The human-machine interaction system may further include a display screen and/or an indicating lamp and/or a speaker, wherein the display screen, the indicating lamp, and the speaker present a current state or function selection item of the automatic cleaning apparatus to the user; and may further include a mobile phone client program. For a path navigation type automatic cleaning apparatus, a mobile phone client may display a map of an environment in which the apparatus is located and a location of the apparatus to the user, so as to provide an enriched and humanized function item to the user.

According to the obstacle avoidance method for the robot provided in this embodiment of the present disclosure, the robot automatically obtains an operation status and a location of the robot through a sensor of the robot during travel of the robot. When it is determined, through the sensor of the robot, that the robot is trapped, the robot records a current location. When travelling to the location again subsequently, because the location has been labeled previously, the robot automatically avoids the location, so that the robot can work continuously without being trapped at the same location for a second time, which is specifically as follows:

As an embodiment, an embodiment of the present disclosure provides an obstacle avoidance method for an automatic cleaning apparatus. As illustrated in FIG. 5, the method includes the following method steps:

Step S502: Trap feature information is obtained in real time during travel of the robot, wherein the trap feature information includes a sensor parameter and/or image information.

The trap feature information refers to a determining information that can indicate an automatic cleaning apparatus to be trapped, including but not limited to a sensor parameter of a cleaning robot, image information obtained by an image collection device, radar information obtained by a radar system, and the like. As described above, the automatic cleaning apparatus includes a collision sensor, a proximity sensor, a cliff sensor, and sensing devices such as a magnetometer, an accelerometer, a gyro (Gyro), and an odograph (ODO) that are disposed within a machine body. These sensors provide various pieces of location information and motion status information of the automatic cleaning apparatus to a control system 130 at a fixed frequency. The control system 130 obtains various sensor parameters of the automatic cleaning apparatus in real time during travel of the robot, and further determines and analyzes a current location and operation status of the automatic cleaning apparatus.

The automatic cleaning apparatus shoots an image in real time during travel of the robot through a camera carried by the automatic cleaning apparatus, wherein image information may be complete photo information, or may be feature information which is extracted from the image and reflects the image, for example, image information obtained after a feature point is extracted. Specifically, the feature information is an image abstract feature, such as a corner, an object boundary line, a color gradient, an optical flow gradient, and a position relationship between the features. The control system 130 obtains image information parameters of the automatic cleaning apparatus in real time during travel of the robot travels, and further determines and analyzes the current location and operation status of the automatic cleaning apparatus.

Step S504: determining whether a current location is in a trap region upon determining that the trap feature information meets a trap condition, wherein the trap region indicates a region in which the automatic cleaning apparatus was trapped or is prone to be trapped.

In an example, determining that the trap feature information meets a trap condition specifically includes: the sensor parameter exceeds a preset first threshold, wherein the sensor parameter includes any one or any combination of the following: an upward tilted angle of the automatic cleaning apparatus; a difference between an angular velocity of an odograph of a primary wheel of the automatic cleaning apparatus and an angular velocity of a gyroscope; and an overcurrent value of a single-wheel current or a double-wheel current of a traveling wheel of the automatic cleaning apparatus.

In an example, the sensor parameter exceeding the preset first threshold includes: when the robot is tilted upward, the upward tilted angle being greater than 2.5 degrees; and/or collecting angular velocity data of the odograph of the primary wheel of the robot and the gyroscope, wherein a continuous time period in which the difference between the angular velocity of the odograph of the primary wheel of the automatic cleaning apparatus and the angular velocity of the gyroscope exceeds a specified value accumulates up to more than 400 ms; and/or the overcurrent of the single-wheel current or the double-wheel current of the traveling wheel of the automatic cleaning apparatus exceeding 500 mA.

Specifically, when the sensor parameter exceeds the first threshold, specifically, for example, when the automatic cleaning apparatus is tilted upward, the upward tilted angle is greater than 2.5 degrees, for example, when the upward tilted angle is ranged from 2.5 to 5 degrees, an alarm is given to the control system. The tilt state of the automatic cleaning apparatus may be learned through a gyroscope or a tilt sensor within the apparatus, and details are not described herein.

The angular velocity data of the odograph of the primary wheel of the automatic cleaning apparatus and the gyroscope are collected, wherein a continuous time period in which the difference between the angular velocity of the odograph of the primary wheel and the angular velocity of the gyroscope exceeds a specified value accumulates up to more than 400 ms. Normally, the angular velocity of the odograph of the primary wheel and the angular velocity of the gyroscope are synchronous, that is, the difference between the angular velocity of the odograph of the primary wheel and the angular velocity of the gyroscope is 0. However, when the automatic cleaning apparatus is trapped, a difference occurs between the angular velocity of the odograph of the primary wheel and the angular velocity of the gyroscope. When the difference exceeds a threshold, for example, 400 ms-500 ms, it can be determined that the automatic cleaning apparatus may be trapped.

The overcurrent of the single-wheel current or the double-wheel current of the traveling wheel of the automatic cleaning apparatus exceeds 500 mA. The drive wheel module includes a travelling wheel, a drive motor, and a control circuit configured to control the drive motor. The drive wheel module is connected a circuit configured to measure a drive current and an odograph. When the measured current value exceeds a threshold of a normal current value, such as 500 mA-800 mA, it can be determined that the automatic cleaning apparatus may be trapped.

In an example, the step further includes: the robot labels a trap mark at a coordinate point of a trap location whenever a trap occurs during travel of the robot; determining whether a current location is in a trap region specifically includes: determining whether the current location is within a specific range of a coordinate point at which a trap mark is labeled; and determining that the current location is in the trap region specifically includes: in a case that the current location is within the specific range of the coordinate point at which a trap mark is labeled, determining that the current location is in the trap region.

In some embodiments, after labeling the trap mark at the coordinate point of the trap location, the method includes: selecting a region with a area and shape around the trap location as the trap region, wherein the trap location is in the trap region.

In specific implementation, the foregoing range may be a circular region with a preset length as a radius and the coordinate point labeled as a trap mark as the center, or may be a quadrilateral with the coordinate point labeled as the trap mark as the center and a preset length as an edge length. The length of the radius and the edge length may be fixed, or may be set to different values according to different types of obstacles.

That the automatic cleaning apparatus queries whether the current location during travel of the robot is within a specified range of the coordinate point labeled with the trap mark includes that: the automatic cleaning apparatus queries, through a cloud, a remote server, or its storage apparatus, whether the current location is within a specified range of the coordinate point labeled with the trap mark. Generally, the trap mark is labeled in a cleaning map in advance. For example, when a trap occurs at a location in each cleaning process, such as a furniture foot, a wall corner, or a lower part of a furniture, the coordinate of the location is labeled with a trap mark. Then, when the sensor parameter is abnormal, the automatic cleaning apparatus automatically queries whether the location is within the specific range of the coordinate point labeled as the trap mark. If not, the current location is labeled with a trap mark, and if yes, obstacle avoidance is performed. For details, refer to the following procedure.

In another implementation, the method further includes: saving, by the automatic cleaning apparatus whenever a trap occurs during travel of the robot, current scenario information collected by an image collection device; determining whether the current location is in the trap region specifically includes: comparing scenario information obtained at the current location with the saved scenario information; and determining whether the current location is in the trap region specifically includes: in a case that the similarity between the scenario information obtained at the current location and the saved scenario information exceeds a preset second threshold, determining that the current location is in the trap region.

That the similarity between the scenario information obtained at the current location and the saved scenario information exceeds correspondingly the preset second threshold specifically includes: a coincidence rate between image information obtained at the current location and saved image information of a scenario exceeds a threshold; or the quantity of feature information of an image obtained at the current location that is consistent saved feature information of an image of a scenario exceeds a threshold.

In a specific implementation process, for example, the location of the trap mark and a specific region around the trap mark are selected as a trap region, for example, the trap region is in a range of 10 cm. A mapping relationship between the location of the trap mark and the trap region is constructed, that is, there are multiple trap marks a, b, and c in a trap region A. For example, when a table foot forms a trap, a table foot part around the table foot may cause a trap. Therefore, multiple trap marks exist around the table foot region A, and trap region A forms a mapping relationship with trap mark a, trap mark b, and trap mark c, as illustrated in FIG. 7.

A process of marking a trap location in region A is as follows: Whenever a trap occurs during travel of the robot, the automatic cleaning apparatus saves current scenario information collected by the image collection device. For example, when a trap occurs at locations a, b, and c, a trap mark is labeled at the locations, and image information in the direction of the image collection device is recorded, as a standard for subsequent comparison.

In an example, the automatic cleaning apparatus saves current scenario information collected by the image collection device whenever a trap occurs during travel of the robot; compares the scenario information obtained at the current location with the saved scenario information; and in a case that the similarity between the scenario information obtained at the current location and the saved scenario information exceeds the preset second threshold, for example, a currently photographed image feature matches a historical image feature by more than 80%, determines that the current location is located in the trap region.

Step S506: giving up a current traveling route and travel out of the trap region upon determining that the current location is located in the trap region.

After the foregoing steps, if it is determined that the current location is located in the trap region, an extrication operation is performed, wherein the extrication operation includes but is not limited to: retreating by a distance and then turning to the left, retreating by a distance and then turning to the right, directly turning to the left, turning to the right, or the like.

In some embodiments, the method further includes: clearing the trap mark at the current location upon determining that the trap feature information does not meet the trap condition when the robot travels to the location of the coordinate point at which a trap mark is labeled.

When the automatic cleaning apparatus travels to the location of the trap mark, and the sensor parameter does not exceed the first threshold, it is considered that there is no obstacle at the location that may easily cause a trap, and the trap mark of the location is deleted. For example, the location may previously have a chair, and subsequently does not constitute an obstacle because the chair is moved. Therefore, the trap mark is deleted.

According to the obstacle avoidance method for the automatic cleaning apparatus provided in this embodiment of the present disclosure, the automatic cleaning apparatus automatically obtains an operation status of the automatic cleaning apparatus through a sensor of the automatic cleaning apparatus during travel of the robot. When it is determined, through the sensor of the automatic cleaning apparatus, that the automatic cleaning apparatus is trapped, a current location is recorded. When subsequently running to the location again, because the location has been marked previously, the automatic cleaning apparatus automatically bypasses the location, so that the automatic cleaning apparatus can continuously work without being trapped at the same location twice, thereby improving automatic cleaning continuity of the automatic cleaning apparatus, working efficiency, and user experience.

In another implementation, this embodiment of the present disclosure provides an obstacle avoidance method for an automatic cleaning apparatus. As illustrated in FIG. 6, the method includes the following steps:

Step S602: Trap feature information is obtained in real time during travel of the robot, wherein the trap feature information includes image information.

The trap feature information indicates any information that can be used to determine whether an automatic cleaning apparatus is trapped, including but not limited to any sensor parameter of a cleaning robot, image information obtained by an image collection device, radar information obtained by a radar system, and the like. The automatic cleaning apparatus picks up an image in real time during travel of the robot through a camera carried by the automatic cleaning apparatus, wherein the image information may be complete photo information, or may be feature information which is extracted from the image to reflect the image, for example, image information obtained after a feature point is extracted. Specifically, the feature information is an image abstract feature, such as a corner, an object boundary line, a color gradient, an optical flow gradient, and a position relationship between the features.

Step S604: determining whether a current location is located in a trap region upon determining that the trap feature information meets a trap condition, wherein the trap region indicates to a region in which the automatic cleaning apparatus was trapped or is prone to be trapped.

In an example, the automatic cleaning apparatus saves, whenever a trap occurs during travel of the robot, current scenario information collected by an image collection device; and determining whether the trap feature information meets a trap condition specifically includes: comparing scenario information obtained at a current location with the saved scenario information; and it is determined that the trap feature information meets the trap condition in a case of similarity between the two pieces of scenario information exceeding a preset third threshold.

In an example, the method further includes: saving, by the automatic cleaning apparatus whenever a trap occurs during the automatic cleaning apparatus travels, current scenario information collected by an image collection device; determining whether a current location is located in the trap region specifically includes: comparing scenario information obtained at a current location with the saved scenario information; and determining whether the current location is located in the trap region specifically includes: determining that the current location is in the trap region in a case of the similarity between the two pieces of scenario information exceeding a preset second threshold.

The similarity between the two pieces of scenario information correspondingly exceeding the preset second threshold or the preset third threshold specifically includes: a coincidence rate between image information obtained at the current location and saved image information of a scenario exceeding the second threshold; or a quantity of feature information of an image obtained at the current location that is consistent with saved feature information of an image of a scenario exceeds the third threshold. Typically, the third threshold is required to be less than the second threshold.

In an embodiment, for example, the location of the trap mark and a specific region around the trap mark, such as a region of 10 cm, are selected as a trap region. A mapping relationship between the location of the trap mark and the trap region is established, that is, there are multiple trap marks, namely trap mark a, trap mark b, and trap mark c, in trap region A. For example, when a table leg forms a trap, a trap may occur upon entering a part of the table leg from a position around the table leg. Therefore, there is multiple trap marks around the table leg region A, and trap region A forms there is a mapping relationship between the trap region A and trap mark a, trap mark b, and trap mark c, as illustrated in FIG. 7.

A process of labeling a trap mark at a trap location in region A is as follows: whenever a trap occurs during the automatic cleaning apparatus travels, the automatic cleaning apparatus saves current scenario information collected by the image collection device. For example, when a trap occurs at locations a, b, or c, a trap mark is label at the location, and image information in a direction in which the image collection device is oriented is recorded, as a standard for subsequent comparison.

In an example, the automatic cleaning apparatus saves current scenario information collected through the image collection device whenever a trap occurs during the automatic cleaning apparatus travels; compares the scenario information obtained at the current location with the saved scenario information; and determines that the trap feature information meets the trap condition in a case that the similarity between the two pieces of scenario information exceeds the preset third threshold, for example, a currently photographed image feature matches a historical image feature by more than 60%.

In an example, the automatic cleaning apparatus saves current scenario information collected by the image collection device whenever a trap occurs during travel of the robot; compares the scenario information obtained at the current location with the saved scenario information; and determines that the current location is located in the trap region in a case that the similarity between the two pieces of scenario information exceeds the preset second threshold, for example, a currently photographed image feature matches a historical image feature by more than 80%.

In another implementation, the image information that is obtained by the camera in a current traveling route is enough to determine that there is an obstacle, for example, when a wall or a cabinet is photographed in the front, historical image information of the location is obtained, and the current image information is compared with the historical image information. When the similarity between the current image information and the historical image information is relatively high, for example, at least 80%, it indicates that there is likely an obstacle that causes a trap, and the obstacle is directly avoided. Otherwise, when the similarity between the two pieces of image information is relatively low, for example, 30%, it is considered that this location is relatively safe, and the autonomous cleaning apparatus may continue to travel according to an original route.

After labeling a trap mark at a coordinate point of a trap location, the method includes: selecting a region with an area and a shape around the trap location as the trap region, wherein the trap location is located in the trap region. In specific implementation, the foregoing range may be a circular region with a preset length as a radius and the coordinate point labeled as the trap mark as a center, or may be a quadrilateral with the coordinate point labeled as the trap mark as a center and with a preset length as an edge length. The length of the radius and the edge length may be fixed, or may be set to different values according to various types of obstacles.

Step S606: upon determining that the current location is located in the trap region, a current traveling route is given up and the autonomous cleaning apparatus travels out of the trap region.

In some embodiments, the method further includes: deleting corresponding saved scenario information in a case that no trap feature information meeting the trap condition is detected within a period of time when traveling to the trap region.

In some embodiments, the method further includes: clearing the trap mark from the current location upon determining that the trap feature information does not meet the trap condition when the automatic cleaning apparatus travels to the location of the coordinate point at which a trap mark is labeled.

In another implementation, for trap mark a located in region A, it is required to determine whether the current image feature information is consistent with the historically stored image information, so as to confirm the trap mark a.

For example, the currently photographed image feature matches the historical image feature by at least 80%, it is considered that the trap mark at the current location is valid according to the current image information. The trap mark that has been confirmed for two times may be taken as a permanent mark. When the automatic cleaning apparatus travels to the location again, the automatic cleaning apparatus directly avoid the obstacle without determining whether the location is a trap location. When the currently photographed image feature matches the historical image feature by 70%, it is considered that it can be determined that there is no obstacle according to the current image feature information, and the trap mark is cleared. For example, there was a chair at the location previously, and now the chair is removed and there is no obstacle, and thus the trap mark is cleared.

According to the obstacle avoidance method for the automatic cleaning apparatus provided in the embodiments of the present disclosure, the automatic cleaning apparatus automatically obtains an operation status of the automatic cleaning apparatus through a sensor of the automatic cleaning apparatus during travel of the robot. When it is determined, according to the image collection device, that the automatic cleaning apparatus is trapped, a current location is recorded. When subsequently travelling to the location again, because the location has been labeled previously, the automatic cleaning apparatus automatically avoid the location, so that the automatic cleaning apparatus can continuously work without being trapped at the same location for a second time, thereby enhancing the continuity of automatic cleaning operation of the automatic cleaning apparatus, and improving working efficiency and user experience.

Figure 8:
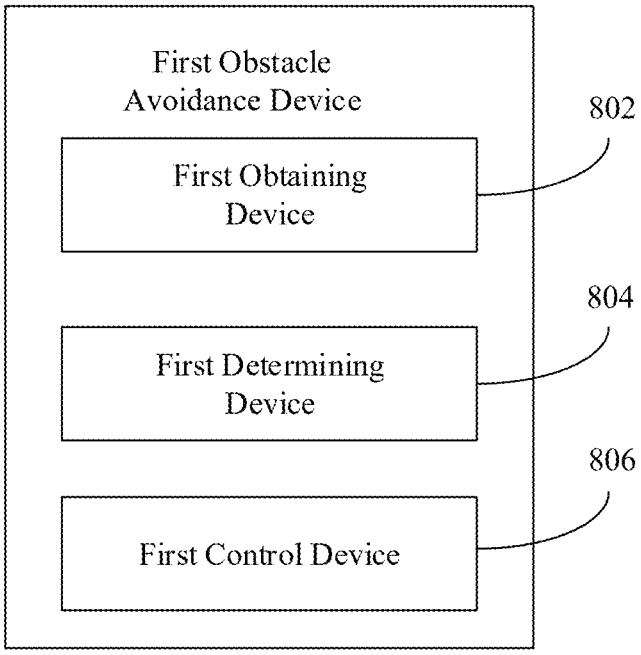
FIG. 8 illustrates a schematic structural diagram of an obstacle avoidance device for an automatic cleaning apparatus according to an embodiment of the present disclosure.

As illustrated in FIG. 8, an embodiment of the present disclosure provides an obstacle avoidance device applicable to an automatic cleaning apparatus, configured to implement the obstacle avoidance method described in the foregoing embodiment. The same technical feature produces the same technical effect, and details are not elaborated herein.

As one of embodiments, an embodiment of the present disclosure provides an obstacle avoidance device applicable to an automatic cleaning apparatus, including:

a first obtaining unit 802, configured to obtain trap feature information in real time during travel of the robot, wherein the trap feature information includes a sensor parameter; and a first determining unit 804, configured to: determine whether a current location is located in a trap region upon determining that the trap feature information meets a trap condition, wherein the trap region indicates a region in which the robot was trapped or is prone to be trapped.

In an example, determining that the trap feature information meets a trap condition specifically includes: the sensor parameter exceeding a preset first threshold, wherein the sensor parameter includes any one or any combination of the following: an upward tilted angle of the automatic cleaning apparatus; a difference between an angular velocity of an odograph of a primary wheel of the automatic cleaning apparatus and an angular velocity of a gyroscope; and an overcurrent value of a single-wheel current or a double-wheel current of a traveling wheel of the automatic cleaning apparatus.

In an example, the sensor parameter exceeding the preset first threshold includes: the upward tilted angle being greater than 2.5 degrees when the automatic cleaning apparatus is tilted upward; and/or collecting angular velocity data of the odograph of the primary wheel of the automatic cleaning apparatus and the gyroscope, wherein a continuous time period in which a difference between the angular velocity of the odograph of the primary wheel and the angular velocity of the gyroscope exceeds a specified value accumulates up to more than 400 ms; and/or the overcurrent of the single-wheel current or the double-wheel current of the traveling wheel of the automatic cleaning apparatus exceeding 500 mA.

In an example, the following is further included: the automatic cleaning apparatus labels a trap mark at a coordinate point of a trap location whenever a trap occurs during travel of the robot; determining whether the current location is located in a trap region specifically includes: determining whether the current location is located within a specific range of a coordinate point at which a trap mark is labeled; and determining that the current location is located in the trap region specifically includes: in a case that the current location located is within the specific range of the coordinate point at which a trap mark is labeled, determining that the current location is located in the trap region.

In some embodiments, after labeling a trap mark at a coordinate point of a trap location, the following is included: selecting a region with an area and a shape around the trap location as the trap region, wherein the trap location is located in the trap region.

A first control unit 806 is configured to give up a current traveling route and control the automatic cleaning apparatus travel out of the trap region upon determining that the current location is in the trap region.

In some embodiments, the following is further included: clearing the trap mark at the current location upon determining the trap feature information does not meet the trap condition when the automatic cleaning apparatus travels to the location of the coordinate point at which a trap mark is labeled.

According to the obstacle avoidance device applicable to the automatic cleaning apparatus provided in this embodiment of the present disclosure, the automatic cleaning apparatus automatically obtains an operation status of the automatic cleaning apparatus during travel of the robot through a sensor of the automatic cleaning apparatus. When it is determined, according to the sensor of the automatic cleaning apparatus, that the automatic cleaning apparatus is trapped, a current location is recorded. When subsequently traveling to the location again, because the location has been labeled previously, the automatic cleaning apparatus automatically avoids the location, so that the automatic cleaning apparatus can continuously work without being trapped at the same location for a second time, thereby enhancing continuity of automatic cleaning operation of the automatic cleaning apparatus, and improving working efficiency and user experience.

Figure 9:
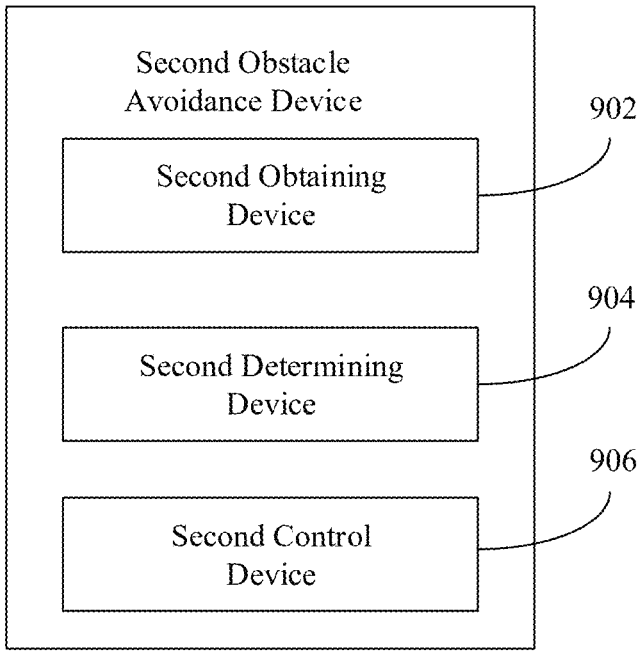
FIG. 9 illustrates a schematic structural diagram of an obstacle avoidance device for an automatic cleaning apparatus according to another embodiment of the present disclosure.

As illustrated in FIG. 9, in another implementation, an embodiment of the present disclosure provides an obstacle avoidance device applicable to an automatic cleaning apparatus, including:

a first obtaining unit 902, configured to obtain trap feature information in real time during travel of the robot, wherein the trap feature information includes image information; and a second determining unit 904, configured to determine whether a current location is located in a trap region upon determining that the trap feature information meets a trap condition, wherein the trap region indicates a region in which the robot was trapped or is prone to be trapped.

In an example, the automatic cleaning apparatus saves, whenever a trap occurs during travel of the robot, current scenario information collected by an image collection device; and determining whether the trap feature information meets a trap condition specifically includes: comparing scenario information obtained at the current location with the saved scenario information; and determining that the trap feature information meets the trap condition when the similarity between the two pieces of scenario information exceeds a preset third threshold.

In an example, the following is further included: The automatic cleaning apparatus saves, whenever a trap occurs during travel of the robot, current scenario information collected by an image collection device; determining whether the current location is located in the trap region specifically includes: comparing scenario information obtained at the current location with the saved scenario information; and determining that the current location is located in the trap region specifically includes: determining that the current location is located in the trap region when the similarity between the two pieces of scenario information exceeds a preset second threshold.

That the similarity between the two pieces of scenario information correspondingly exceeds the preset second threshold or third threshold specifically includes: a coincidence rate between image information obtained at the current location and saved image information of a scenario exceeding the third threshold; or a quantity of feature information of an image obtained at the current location that is consistent with saved feature information of an image of a scenario exceeding the second threshold. Typically, the third threshold is required to be less than the second threshold.

After labeling a trap mark at a coordinate point of a trap location, the following is included: selecting a region with an area and a shape around the trap location as the trap region, wherein the trap location is located in the trap region. In specific implementation, the foregoing range may be a circular region with a preset length as a radius and with the coordinate point labeled as a trap mark as the center, or may be a quadrilateral with the coordinate point labeled as a trap mark as the center and with a preset length as an edge length. The length of the radius and the edge length may be fixed, or may be set to different values according to various types of obstacles.

A second control unit 906 is configured to: give up a current traveling route and control the automatic cleaning apparatus to travel out of the trap region upon determining that the current location is located in the trap region.

In some embodiments, the following is further included: deleting corresponding saved scenario information in a case that no trap feature information meeting the trap condition is detected within a period of time when traveling to the trap region.

In some embodiments, the following is further included: clearing the trap mark at the current location upon determining that no trap feature information meets the trap condition when the automatic cleaning apparatus travels to a location of the coordinate point at which a trap mark is labeled.

According to the obstacle avoidance device applicable to the automatic cleaning apparatus provided in this embodiment of the present disclosure, the automatic cleaning apparatus automatically obtains an operation status of the automatic cleaning apparatus during travel of the robot through a sensor of the automatic cleaning apparatus. Upon determining, according to the image collection device, that the automatic cleaning apparatus is trapped, a current location is recorded. When subsequently traveling to the location again, because the location has been labeled previously, the automatic cleaning apparatus automatically avoids the location, so that the automatic cleaning apparatus can continuously work without being trapped at the same location for a second time, thereby enhancing continuity of automatic cleaning operation of the automatic cleaning apparatus, and improving working efficiency and user experience.

As another embodiment, an embodiment of the present disclosure provides an obstacle avoidance method applicable to an automatic cleaning apparatus. As illustrated in FIG. 10, the method includes the following method steps:

Step S1002: trap feature information is obtained in real time during travel of the robot, wherein the trap feature information includes image information.

The trap feature information refers to any information that can be used to determine whether a robot is trapped or is prone to be trapped, including but not limited to any sensor parameter of a cleaning robot, image information obtained by an image collection device, radar information obtained by a radar system, and the like. The automatic cleaning apparatus shoots an image in real time during traveling by a camera carried by the automatic cleaning apparatus, wherein image information may be complete photo information, or may be feature information that is extracted from the image to reflect the image, for example, image information obtained after extracting a feature point. Specifically, the feature information is an image abstract feature, such as a corner, an object boundary line, a color gradient, an optical flow gradient, and a position relationship between the features.

Step S1004: monitoring a sensor parameter in real time upon determining that the trap feature information meets a trap condition.

Determining that the trap feature information meets a trap condition specifically includes: the image information includes a preset obstacle or scenario that is prone to cause a trap.

In an example, the automatic cleaning apparatus saves current scenario information collected by the image collection device whenever a trap occurs during travel of the robot; compares the scenario information obtained at the current location with the saved scenario information; and determines that the current image information includes a scenario that is prone to cause a trap when the similarity between the two pieces of scenario information exceeds the preset threshold, for example, a currently photographed image feature matches a historical image feature by more than 60%.

In an example, the automatic cleaning apparatus saves an image of an obstacle collected by the image collection device whenever a trap occurs during travel of the robot; compares the image of the obstacle obtained at the current location with the saved obstacle; and determines that the current image information includes an obstacle that may cause a trap when similarity between the two obstacles exceeds a preset threshold, for example, a currently photographed obstacle feature matches a historical obstacle feature by more than 80%.

The sensor parameter includes any one or any combination of the following: an upward tilted angle of the automatic cleaning apparatus; a difference between an angular velocity of an odograph of a primary wheel of the automatic cleaning apparatus and an angular velocity of a gyroscope; and an overcurrent value of a single-wheel current or a double-wheel current of a traveling wheel of the automatic cleaning apparatus.

Step S1006: When it is detected that the sensor parameter exceeds a preset value, giving up a current traveling route.

In an example, the sensor parameter exceeding the preset value, includes: when the robot is tilted upward, the upward tilted angle being greater than 2.5 degrees; and/or collecting angular velocity data of the odograph of the primary wheel of the robot and the gyroscope, wherein a continuous time period in which the difference between the angular velocity of the odograph of the primary wheel of the robot and the angular velocity of the gyroscope exceeds a specified value accumulates up to more than 400 ms; and/or the overcurrent of the single-wheel current or the double-wheel current of the traveling wheel of the robot exceeding 500 mA.

Specifically, when the sensor parameter exceeds the preset value, specifically, for example, when the automatic cleaning apparatus is tilted upward, the upward tilted angle is greater than 2.5 degrees, for example, when the upward tilted angle is 2.5 to 5 degrees, an alarm is sent to the control system. The tilt state of the automatic cleaning apparatus may be acquired by a gyroscope or a tilt sensor disposed inside the apparatus, and details are not described herein.

The angular velocity data of the odograph of the primary wheel of the automatic cleaning apparatus and the gyroscope are collected, wherein a continuous time period in which the difference between the angular velocity of the odograph of the primary wheel and the angular velocity of the gyroscope exceeds a specified value accumulates up to more than 400 ms. Normally, the angular velocity of the odograph of the primary wheel and the angular velocity of the gyroscope are synchronous, that is, the difference between the angular velocity of the odograph of the primary wheel and the angular velocity of the gyroscope is 0. However, when the automatic cleaning apparatus is trapped, a difference occurs between the angular velocity of the odograph of the primary wheel and the angular velocity of the gyroscope. When a continuous time period in which the difference exists accumulates up to, for example, 400 ms-500 ms, it may be determined that the automatic cleaning apparatus may be trapped.

The overcurrent of the single-wheel current or the double-wheel current of the traveling wheel of the automatic cleaning apparatus exceeds 500 mA. The drive wheel module includes a traveling wheel, a drive motor, and a control circuit configured to the drive motor. The drive wheel module connects a circuit configured to measure a drive current and an odograph. When the measured current value exceeds a normal current value by a threshold, such as 500 mA-800 mA, it may be determined that the automatic cleaning apparatus may be trapped.

Upon determining that the sensor parameter exceeds the preset value, the automatic cleaning apparatus gives up the current traveling route, and travels out of the trap region. The traveling manner includes but is not limited to: retreating by a distance and then turning to the left, retreating by a distance and then turning to the right, directly turning to the left or the right, or the like.

According to the obstacle avoidance method applicable to the automatic cleaning apparatus provided in this embodiment of the present disclosure, the automatic cleaning apparatus constructs a trap scenario model or an obstacle model by an image sensor during travel of the robot. When the automatic cleaning apparatus arrives at the location, a potential trap is determined by the image sensor, and combined with the sensor parameter of the automatic cleaning apparatus obtained by another sensor, it is further determined whether a current location is a trap location. Upon determining that the current location is a trap location, the traveling route is changed, so that the automatic cleaning apparatus can continuously work without being trapped at the same location for a second time, thereby enhancing automatic cleaning continuity of the automatic cleaning apparatus, and improving working efficiency and user experience.

As another embodiment, an embodiment of the present disclosure provides an obstacle avoidance device applicable to an automatic cleaning apparatus. As illustrated in FIG. 11, the apparatus includes:

a capturing unit 1102, configured to obtain trap feature information in real time during travel of the robot, wherein the trap feature information includes image information; and a monitoring unit 1104, configured to monitor a sensor parameter in real time when determining that the trap feature information meets a trap condition.

Determining that the trap feature information meets a trap condition specifically includes: the image information includes a preset obstacle or scenario that is prone to cause a trap.

The sensor parameter includes any one or any combination of the following: an upward tilted angle of the automatic cleaning apparatus; a difference between an angular velocity of an odograph of a primary wheel of the automatic cleaning apparatus and an angular velocity of a gyroscope; and an overcurrent value of a single-wheel current or a double-wheel current of a traveling wheel of the automatic cleaning apparatus.

An operation unit 1106 is configured to change a current traveling route when the sensor parameter exceeding a preset value detected.

In an example, the sensor parameter exceeding the preset value includes: when the automatic cleaning apparatus is tilted upward, the upward tilted angle being greater than 2.5 degrees; and/or collecting angular velocity data of the odograph of the primary wheel of the automatic cleaning apparatus and the gyroscope, wherein a continuous time period in which the difference between the angular velocity of the odograph of the primary wheel and the angular velocity of the gyroscope exceeds a specified value accumulates up to more than 400 ms; and/or the overcurrent of the single-wheel current or the double-wheel current of the traveling wheel of the automatic cleaning apparatus exceeding 500 mA.

According to the obstacle avoidance device applicable to the automatic cleaning apparatus provided in this embodiment of the present disclosure, the automatic cleaning apparatus constructs a trap scenario model or an obstacle model through an image sensor during travel of the robot. When the automatic cleaning apparatus arrives at the location, a potential trap is determined through the image sensor, and combined with the sensor parameter of the automatic cleaning apparatus obtained by other sensor, it is further determined whether a current location is a trap location. Upon determining that the current location is a trap location, the traveling route is given up, so that the automatic cleaning apparatus can continuously work without being trapped at the same location for a second time, thereby enhancing continuity of automatic cleaning operation of the automatic cleaning apparatus, improving working efficiency and user experience.

An embodiment of the present disclosure provides a non-transitory computer readable storage medium, on which a computer program instruction is stored, and the computer program instruction implements operations of any one of the foregoing methods when being invoked and executed by a processor.

An embodiment of the present disclosure provides an automatic cleaning apparatus, including a processor and a memory, wherein the memory stores a computer program instruction that can be executed by the processor, and the processor implements operations of the method according to any one of the foregoing embodiments when executing the computer program instruction.

Figure 12:
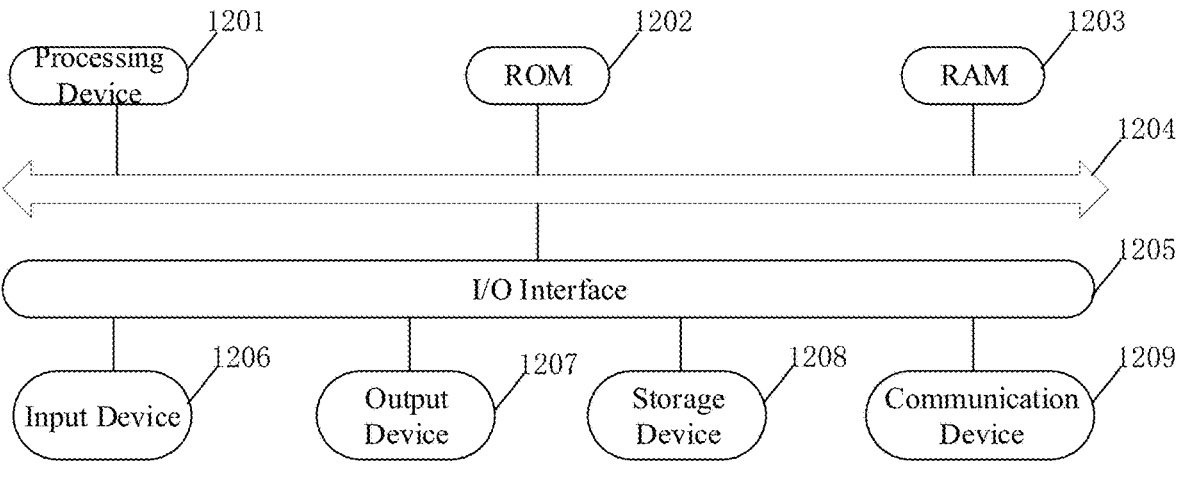
FIG. 12 illustrates a schematic diagram of an electronic structure of a robot according to an embodiment of the present disclosure.

As illustrated in FIG. 12, the automatic cleaning apparatus may include a processing device (such as a central processing unit, a graphics processing unit, or the like) 1201 that may perform various appropriate actions and processing according to a program stored in a read-only memory (ROM) 1202 or a program loaded from a storage apparatus 1208 into a random access memory (RAM) 1203. In the RAM 1203, various programs and data required for operation of an automatic cleaning apparatus 1200 are further stored. The processing device 1201, the ROM 1202, and the RAM 1203 are connected to each other through a bus 1204. An input/output (I/O) interface 1205 is also connected to the bus 1204.

Typically, the following devices may be connected to the I/O interface 1205: an input device 1206 including, for example, a touchscreen, a touchpad, a keyboard, a mouse, a camera, a microphone, an accelerometer, and a gyroscope; an output device 1207 including, for example, a liquid crystal display (LCD), a loudspeaker and a vibrator; a storage device 1208 including, for example, a hard disk; and a communications device 1209. The communications device 1209 may enable the automatic cleaning apparatus to communicate wirelessly or wiredly with another robot to exchange data. Although FIG. 12 illustrates an automatic cleaning apparatus with various devices, it should be understood that it is not required to implement or provide all illustrated devices. Alternatively, more or fewer devices may be implemented or provided.

In particular, according to the embodiments of the present disclosure, the process described above with reference to the flowchart may be implemented as a software program of the automatic cleaning apparatus. For example, an embodiment of the present disclosure provides an automatic cleaning apparatus software program product that includes a computer program carried on a readable medium, and the computer program includes program code configured to perform operations of the method illustrated in the flowchart. In such an embodiment, the computer program may be downloaded from a network through the communications device 1209 and installed, or may be installed from the storage apparatus 1208, or may be installed from the ROM 1202. When the computer program is executed by the processing device 1201, the foregoing operations defined in the method according to the embodiments of the present disclosure are performed.

It should be noted that the foregoing computer readable medium in the present disclosure may be a computer readable signal medium, a computer readable storage medium, or any combination thereof. The computer readable storage medium may be, for example, an electrical, magnetic, optical, electromagnetic, infrared, or semiconductor system, apparatus, or device, or any combination thereof. More specific examples of the computer readable storage medium may include but are not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer readable storage medium may be any tangible medium that includes or stores a program, and the program may be used by an instruction execution system, device, or apparatus, or a combination thereof. In the present disclosure, the computer readable signal medium may include a data signal propagated in a baseband or as a part of a carrier, which carries computer readable program code. Such a propagated data signal may be in multiple forms, including but not limited to an electromagnetic signal, an optical signal, or any suitable combination thereof. The computer readable signal medium may further be any computer readable medium other than the computer readable storage medium, and the computer readable signal medium may send, propagate, or transmit a program that is used by an instruction execution system, device, or apparatus, or a combination thereof. The program code included in the computer readable medium may be transmitted through any suitable medium, including but not limited to: a wire, an optical cable, a radio frequency (RF), or any suitable combination thereof.

The computer readable medium may be included in the foregoing automatic cleaning apparatus, or may exist separately and not be assembled into the automatic cleaning apparatus.

Computer program code for performing the operations of the present disclosure may be written in one or more programming languages or a combination thereof, such as object-oriented programming languages Java, Smalltalk, C++, and conventional procedural programming languages such as "C" or similar program design languages. The program code may be executed on a user computer, completely or partially, or as an independent package, or on a user computer partially and on a remote computer partially, or on a remote computer or server completely. In cases involving a remote computer, the remote computer may be connected to a user computer through any type of network, including a local area network (LAN) or a wide area network (WAN), or may be connected to an external computer (for example, through the Internet by an Internet service provider).

Flowcharts and block diagrams in the accompanying drawings illustrate possible architectures, functions, and operations of systems, methods, and computer program products according to various embodiments of the present disclosure. In this regard, each block in the flowcharts or block diagrams may represent a module, program segment, or part of code that includes one or more executable instructions for implementing a specified logical function. It should also be noted that in some alternative implementations, functions marked in the block may also be performed in different order than those marked in the accompanying drawings. For example, two blocks represented in succession may actually be executed in actually parallel, and they may sometimes be executed in a reverse order, depending on the functions involved. It should also be noted that each block in the block diagram and/or flowchart and a combination of blocks in the block diagram and/or flowchart may be implemented by a dedicated hardware-based system that performs a specified function or operation, or may be implemented by a combination of a dedicated hardware and a computer instruction.

Compared with the prior art, the embodiments of the present disclosure have at least the following technical effects:

According to the obstacle avoidance method for the robot according to the embodiment of the present disclosure, the robot automatically obtains an operation status of the robot through a sensor or an image collection device of the robot in the traveling process. When it is determined that the robot is trapped, a current location is recorded. When travelling to the location again subsequently, because the location has been marked previously, the robot automatically bypasses the location, so that the robot can continuously work without being trapped at the same location for the second time, thereby improving automatic sweeping continuity of the robot, improving working efficiency, and improving user experience.

The apparatus embodiment described above is merely illustrative. The units described as separate parts may or may not be physically separate, and parts displayed as units may or may not be physical units, can be located in one location, or can be distributed on a plurality of network units. Some or all of the modules can be selected according to actual requirements to implement the solutions of the embodiments. One of ordinary skill in the art can understand and implement the embodiments of the present application without creative efforts.

Finally, it should be noted that the foregoing embodiments are merely intended for describing the technical solutions of the present disclosure, but not for limiting the present disclosure. Although the present disclosure is described in detail with reference to the previous embodiments, one of ordinary skill in the art should understand that they can still make modifications to the technical solutions described in the previous embodiments or make equivalent replacements to some technical features thereof, without departing from the gist and scope of the technical solutions of the embodiments of the present disclosure.

What is claimed is:

1. An obstacle avoidance method for a robot, performed by the robot, wherein the method comprises:
    obtaining trap feature information in real time during travel of the robot, wherein the trap feature information comprises at least one of a sensor parameter and first image information, wherein the first image information is image information acquired in real time during the travel of the robot;
    in response to determining that the trap feature information meets a trap condition, determining the robot is prone to be trapped; wherein the trap feature information meeting the trap condition comprises at least one of:
        the sensor parameter exceeding a preset first threshold; or
        a similarity between the first image information and second image information exceeding a preset second threshold; wherein the second image information comprises image information saved in response to that the robot detects a trap during the travel of the robot;
    determining whether a current location is located in a trap region, wherein the trap region indicates a region in which the robot was trapped or is prone to be trapped;
    in response to determining that the current location is located in the trap region, giving up travelling a current traveling route, and traveling out of the trap region;

saving, in response to the robot being trapped, scenario information of a trap location where the robot is trapped; and
    when the robot travels to the trap region, deleting, in response to determining that the trap feature information does not meet the trap condition for a period of time, the scenario information.

2. The method according to claim 1, further comprising:
    labeling, by the robot, a trap mark at a coordinate point of the trap location in response to detecting a trap during the travel of the robot;
    wherein determining whether the current location is located in the trap region comprises:
        determining whether the current location is located within a specific range of the coordinate point; and
    determining that the current location is located in the trap region comprises:
        determining that the current location is located in the trap region in response to that the current location is located within the specific range of the coordinate point.

3. The method according to claim 1, wherein the second image information is collected by an image collection device, in a case that the similarity between the first image information and the second image information exceeding the preset second threshold, the method further comprises:
    comparing the first image information with the second image information;
    in response to determining that the similarity between the first image information and the second image information exceeding a preset third threshold, determining that the current location is located in the trap region, wherein the preset third threshold is greater than the preset second threshold.

4. The method according to claim 1, wherein the sensor parameter comprises any one or any combination of the following:
    an upward tilted angle of the robot;
    a difference between an angular velocity of an odograph of a primary wheel of the robot and an angular velocity of a gyroscope of the robot; and
    an overcurrent value of a single-wheel current or a double-wheel current of a traveling wheel of the robot.

5. The method according to claim 4, wherein the sensor parameter exceeding the preset first threshold comprises at least one of the following:
    in response to that the robot is tilted upward, determining that the upward tilted angle is greater than 2.5 degrees;
    collecting angular velocity data of the odograph of the primary wheel of the robot and angular velocity data of the gyroscope, wherein a continuous time period in which the difference is greater than a specified value accumulates up to more than 400 ms; and
    determining that the overcurrent of the single-wheel current or the double-wheel current of the traveling wheel of the robot exceeds 500 mA.

6. The method according to claim 2, wherein the similarity between the first image information and the second image information exceeding the preset second threshold comprises:
    comparing the first image information with the second image information; and
    determining that the trap feature information meets the trap condition in response to that the similarity between the first image information and the second image information exceeds the preset second threshold.

7. The method according to claim 3, wherein the similarity between the first image information and the second image information exceeding the preset second threshold or the preset third threshold comprises:

a coincidence rate between the first image information and the second image information exceeding the preset second threshold or the preset third threshold; or a number of matching feature information items of a first image corresponding to the first image information and a second image corresponding to the second image information exceeding the preset second threshold or the preset third threshold.

8. The method according to claim 2, further comprising:

determining a region with an area and a shape around the trap location as the trap region, wherein the trap location is located in the trap region.

9. The method according to claim 2, further comprising:

clearing the trap mark in response to determining that the trap feature information does not meet the trap condition when the robot travels to the coordinate point.

10. A non-transitory computer readable storage medium, wherein a computer program instruction is stored, and the computer program instruction performs operations of a method according to claim 1 when being invoked and executed by a processor.

11. An obstacle avoidance device for a robot, comprising:

a processor; and a memory configured to store instructions executable by the processor;

wherein the processor is configured to execute the instructions to implement following operations:

obtaining trap feature information in real time during travel of the robot, wherein the trap feature information comprises at least one of a sensor parameter and first image information, wherein the first image information is image information acquired in real time during the travel of the robot;

in response to determining that the trap feature information meets a trap condition, determining the robot is prone to be trapped; wherein the trap feature information meeting the trap condition comprises at least one of:

the sensor parameter exceeding a preset first threshold; or a similarity between the first image information and second image information exceeding a preset second threshold; wherein the second image information comprises image information saved in response to that the robot detects a trap during the travel of the robot;

determining whether a current location is located in a trap region, wherein the trap region indicates a region in which the robot was trapped or is prone to be trapped;

in response to determining that the current location is located in the trap region, giving up travelling a current traveling route, and traveling out of the trap region;

saving, in response to the robot being trapped, scenario information of a trap location where the robot is trapped; and when the robot travels to the trap region, deleting, in response to determining that the trap feature information does not meet the trap condition for a period of time, the scenario information.

12. The obstacle avoidance device for a robot according to claim 11, wherein the processor is configured to execute the instructions to implement the following operations:

labeling, by the robot, a trap mark at a coordinate point of the trap location in response to detecting a trap during travel of the robot;

wherein determining whether the current location is located in the trap region comprises:

determining whether the current location is located within a specific range of the coordinate point; and determining that the current location is located in the trap region comprises:

determining that the current location is located in the trap region in response to that the current location is located within the specific range of the coordinate point.

13. The obstacle avoidance device for a robot according to claim 11, wherein the second image information is collected by an image collection device, in a case that the similarity between the first image information and the second image information exceeding the preset second threshold, wherein the processor is configured to execute the instructions to implement the following operations:

comparing the first image information with the second image information;

in response to determining that the similarity between the first image information and the second image information exceeding a preset third threshold, determining that the current location is located in the trap region, wherein the preset third threshold is greater than the preset second threshold.

14. The obstacle avoidance device for a robot according to claim 11, wherein the sensor parameter comprises any one or any combination of the following:

an upward tilted angle of the robot;

a difference between an angular velocity of an odograph of a primary wheel of the robot and an angular velocity of a gyroscope of the robot; and an overcurrent value of a single-wheel current or a double-wheel current of a traveling wheel of the robot.

15. The obstacle avoidance device for a robot according to claim 14, wherein the sensor parameter exceeding the preset first threshold comprises at least one of the following instructions executed by the processor:

in response to that the robot is tilted upward, determining that the upward tilted angle is greater than 2.5 degrees;

collecting angular velocity data of the odograph of the primary wheel of the robot and angular velocity data of the gyroscope, wherein a continuous time period in which the difference is greater than a specified value accumulates up to more than 400 ms; and determining that the overcurrent of the single-wheel current or the double-wheel current of the traveling wheel of the robot exceeds 500 mA.

* * * * *